(12) United States Patent
Coon et al.

(10) Patent No.: US 8,055,110 B2
(45) Date of Patent: Nov. 8, 2011

(54) BEND INSENSITIVE FIBER WITH REDUCED HEAT INDUCED LOSS

(75) Inventors: Jeffrey Coon, Wilmington, NC (US); Lisa Larae Hepburn, Corning, NY (US); Ming-Jun Li, Horseheads, NY (US); Kevin Bryan Sparks, Hickory, NC (US)

(73) Assignee: Corning Incorporated, Corning, NY (US)

( * ) Notice: Subject to any disclaimer, the term of this patent is extended or adjusted under 35 U.S.C. 154(b) by 263 days.

(21) Appl. No.: 12/611,563

(22) Filed: Nov. 3, 2009

(65) Prior Publication Data

US 2010/0124396 A1    May 20, 2010

Related U.S. Application Data

(60) Provisional application No. 61/115,319, filed on Nov. 17, 2008.

(51) Int. Cl.
*G02B 6/032* (2006.01)

(52) U.S. Cl. ........... 385/125; 385/123; 385/124; 385/96

(58) Field of Classification Search .................. None
See application file for complete search history.

(56) References Cited

U.S. PATENT DOCUMENTS

| | | |
|---|---|---|
| 5,337,380 A | 8/1994 | Darbon et al. ............... 385/28 |
| RE35,138 E | 1/1996 | Weidman ...................... 385/42 |
| 6,859,597 B2 | 2/2005 | Wang et al. .................. 385/125 |
| 7,046,890 B2 | 5/2006 | Sparks ........................ 385/127 |
| 7,184,623 B2 | 2/2007 | Cai et al. ..................... 385/28 |
| 7,280,730 B2 | 10/2007 | Dong et al. .................. 385/126 |
| 7,450,806 B2 | 11/2008 | Bookbinder et al. ......... 385/125 |
| 2002/0031303 A1 | 3/2002 | Wang ............................. 385/39 |
| 2003/0081915 A1 | 5/2003 | Fajardo et al. ............... 385/96 |
| 2006/0067632 A1 | 3/2006 | Broeng et al. ............... 385/96 |
| 2007/0104437 A1 | 5/2007 | Bookbinder et al. ......... 385/125 |
| 2008/0037939 A1 | 2/2008 | Xiao et al. ................... 385/96 |
| 2009/0052853 A1* | 2/2009 | Mukasa et al. ............... 385/125 |

FOREIGN PATENT DOCUMENTS

| WO | WO00/19256 | 4/2000 |
| WO | WO 03/081301 | 10/2003 |
| WO | WO 2008/063401 | 5/2008 |
| WO | WO 2008/106183 | 9/2008 |
| WO | WO 2009/099579 | 8/2009 |

* cited by examiner

*Primary Examiner* — Hemang Sanghavi
(74) *Attorney, Agent, or Firm* — Matthew J. Mason (57) ABSTRACT

Microstructured optical fiber for single-moded transmission of optical signals, the optical fiber including a core region and a cladding region, the cladding region including an annular hole-containing region that contains non-periodically disposed holes. The annular hole containing region is doped with at least one dopant selected from fluorine and chlorine. The optical fiber provides low bend loss as well as low heat-induced splice loss.

20 Claims, 8 Drawing Sheets

BEND INSENSITIVE FIBER WITH REDUCED HEAT INDUCED LOSS

CROSS-REFERENCE TO RELATED APPLICATIONS

This application claims the benefit of, and priority to U.S. Provisional Patent Application No. 61/115,319 filed on Nov. 17, 2008 entitled, "Bend Insensitive Fiber With Reduced Heat Induced Loss", the content of which is relied upon and incorporated herein by reference in its entirety.

BACKGROUND OF THE INVENTION

1. Field of the Invention

The present invention relates generally to optical fiber, and particularly to bend resistant optical fiber with reduced heat induced loss.

2. Technical Background

Tapered or heat-treated optical fibers are utilized in fiber pigtails, optical couplers, splicing, connectors and other optical components. Such tapering or heat-treatment can induce optical power loss. As performance requirements for the optical components become increasingly more stringent, the need to eliminate such loss becomes increasingly critical.

Tapering or heat-treatment can pose a particular challenge when the fibers to be treated are nanostructured optical fibers. Nanostructured optical fibers are a class of fibers developed to have ultra-low bend loss allowing for a wide variety of applications. These fibers include holes or voids running longitudinally along the fiber axis and heating the fiber causes the holes or voids to collapse, which can result in undesirable optical power leakage.

SUMMARY OF THE INVENTION

One aspect of the invention is a single mode microstructured optical fiber that includes a core region disposed about a longitudinal centerline and having a refractive index profile with a first refractive index and a cladding region surrounding the core region, the cladding region including an annular hole-containing region comprised of non-periodically dispersed holes. The non-periodically dispersed holes include a percent regional void area percent in the hole-containing region which is between 2 and 10 percent, and an average number density of holes in said hole-containing region is greater than 0.5 per microns$^2$. The annular hole-containing region is doped with at least one dopant selected from fluorine having an average concentration of from 0.4 wt % to 1.2 wt % and chlorine having an average concentration of from 0.05 wt % to 0.2 wt %.

In another aspect, the present invention includes a single mode microstructured optical fiber that includes a core region disposed about a longitudinal centerline and having a refractive index profile with a first refractive index, and a cladding region surrounding the core region, the cladding region including an annular hole-containing region comprised of non-periodically dispersed holes. The non-periodically dispersed holes include a percent regional void area percent in the hole-containing region which is between 2 and 10 percent, and an average number density of holes in said hole-containing region is greater than 0.5 per microns$^2$. When the fiber is exposed to heat sufficient to cause the holes in the hole-containing region in the fiber to collapse upon being spliced to another fiber, the fiber is capable of providing a splice loss of less than 0.6 dB at all wavelengths between 1310 nm and 1625 nm.

In preferred embodiments, optical fiber disclosed herein is capable of providing a bend loss of less than 0.5 dB per turn at a wavelength of 1550 nm for a 20 mm diameter bend.

In preferred embodiments, when optical fiber disclosed herein is exposed to heat sufficient to cause the holes in the hole-containing region in the fiber to collapse in a heated region, the fiber is capable of providing for a mode field diameter change in the heated region of less than 12% at all wavelengths between 1310 nm and 1625 nm.

In preferred embodiments, optical fiber disclosed herein has a mode field diameter of greater than 9 microns at a wavelength of 1550 nm.

In preferred embodiments, the core region of optical fiber disclosed herein includes a core segment that extends from a centerline to a radius $R_1$ having a positive maximum refractive index relative to pure silica $\Delta_1$ in %, and the optical fiber further comprises an inner annular hole-free region between the core segment and the hole-containing region extending from a radius $R_1$ to a radius $R_2$, and having a radial width $W_{12}$, equal to $R_2-R_1$, wherein $0.30\% < \Delta_1 < 0.40\%$, $3.5\ \mu m < R_1 < 5.0\ \mu m$, $W_{12}$ is greater than 1 μm, and $R_1/R_2$, is greater than 0.2.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the refractive index of pure (undoped) silica.

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

Fiber cutoff wavelength as used herein is measured by the standard 2m fiber cutoff test, FOTP-80 (EIA-TIA-455-80), to yield the "fiber cutoff wavelength", also known as the "2m fiber cutoff" or "fiber cutoff".

Cable cutoff wavelength as used herein is measured by the standard 22m cable cutoff test, FOTP-170 (EIA-455-170), to yield the "cable cutoff wavelength", also known as the "22m cutoff wavelength" or "cable cutoff".

The mode field diameter (MFD) is measured using the Peterman II method wherein, $2w = MFD$, and $w^2 = (2\int f^2 r dr / \int [df/dr]^2 r dr)$, the integral limits being 0 to ∞.

All optical properties (such as dispersion, dispersion slope, bending, etc.) are reported herein at a wavelength of 1550 nm unless otherwise noted.

During the manufacture of transmission optical fibers by conventional soot deposition processes such as the outside vapor deposition (OVD) process or the vapor axial deposition (VAD) process, silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine) to remove water and metal impurities and are then consolidated or sintered into glass blanks at temperatures ranging from 1100-1500° C. Surface energy driven viscous flow sintering is the dominant mechanism of sintering, which results in densification and closing of the pores of the soot, thereby forming a consolidated glass preform. During the final stages of sintering, the gases used in consolidation may become trapped as the open pores are closed. If the solubility and permeability of the trapped gases in the glass are high at the sintering temperature, then the gases are able to migrate through and out of the glass during the consolidation process. Alternatively, gases which are still trapped after the consolidation phase of the fiber manufacturing process may be outgassed by holding the fiber preforms for a period until the gases migrate out through the glass preforms, thereby leaving one or more voids with vacuum therein within the preform. During the draw operation when the optical fiber is drawn from the preform, these voids close, leaving a void-free or essentially void-free optical fiber. In consolidation processes which are employed to make conventional transmission optical fiber, the goal is to achieve an optical fiber that is entirely free of voids in both the core and cladding region of the optical fiber. Helium is often the gas utilized as the atmosphere during the consolidation of conventional optical fiber preforms. Because helium is very permeable in glass, it very easily exits the soot preform and the glass during the consolidation process, so that after consolidating in helium the glass is free of pores or voids.

The optical fiber disclosed herein is made from a preform that was subjected to preform consolidation conditions which are effective to result in a significant amount of gases being trapped in a region of the consolidated glass blank, thereby causing the formation of non-periodically distributed voids in the void-containing region of the consolidated glass optical fiber preform. Rather than taking steps to remove these voids, the resultant preform is purposefully used to form an optical fiber with voids therein. In particular, by utilizing relatively low permeability gases and/or relatively high sintering rates, holes can be trapped in the consolidated glass during the consolidation process. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

In the optical fiber disclosed herein, the non-periodically distributed holes or voids which are present in the optical fiber as a result of using the processes disclosed herein are located in the cladding of the optical fiber. Such voids can be used to lower refractive index. By utilizing the consolidation parameters so that the maximum diameter of the holes or voids is less than the wavelength of the light which is to be transmitted along the length of the fiber (e.g. in the case of optical fibers for use in telecommunications applications, less than 1550 nm), the fiber may be effectively used to transmit information at a particular wavelength.

Figure 1:
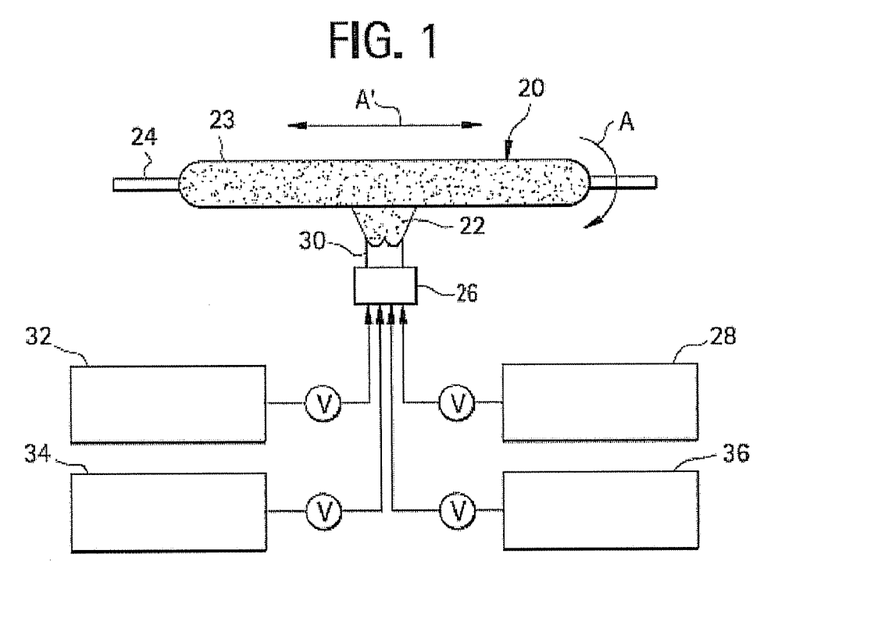
FIG. 1 illustrates an OVD method for forming a soot preform.

FIG. 1 illustrates a method of manufacturing a soot optical fiber preform 20 which can be used to make the optical fiber disclosed herein. In the embodiment illustrated in FIG. 1, soot preform 2 is formed by depositing silica-containing soot 22 onto an outside of a rotating and translating mandrel or bait rod 24. This process is known as the OVD or outside vapor deposition process. Mandrel 24 is preferably tapered. The soot 22 is formed by providing a glass precursor 28 in gaseous form to the flame 30 of a burner 26 to oxidize it. Fuel 32, such as methane ($CH_4$), and combustion supporting gas 34, such as oxygen, are provided to the burner 26 and ignited to form the flame 30. Mass flow controllers, labeled V, meter the appropriate amounts of suitable dopant compound 36 silica glass precursor 28, fuel 32 and combustion supporting gas 34, all preferably in gaseous form, to the burner 26. The glass former compounds 28, 36 are oxidized in the flame 30 to form the generally cylindrically-shaped soot region 23. In particular, a dopant compound 36 may be included if desired. For example, a germanium compound may be included as an index of refraction increasing dopant (e.g. in the core of the fiber).

A fluorine containing compound is preferably included to lower the index of refraction in the cladding and, in particular, the void containing region of the fiber. Preferably, the fluorine containing compound is added as a dopant during an OVD process in a manner such that the fluorine doped region will substantially overlap the void-containing region of the fiber. In preferred embodiments, the fluorine containing compound is added such that the average amount of fluorine in the void-containing region of the fiber ranges from 0.4 wt % to 1.2 wt %, such as from 0.5 wt % to 1.0 wt %, and further such as from 0.6 wt % to 0.8 wt %.

Figure 2:
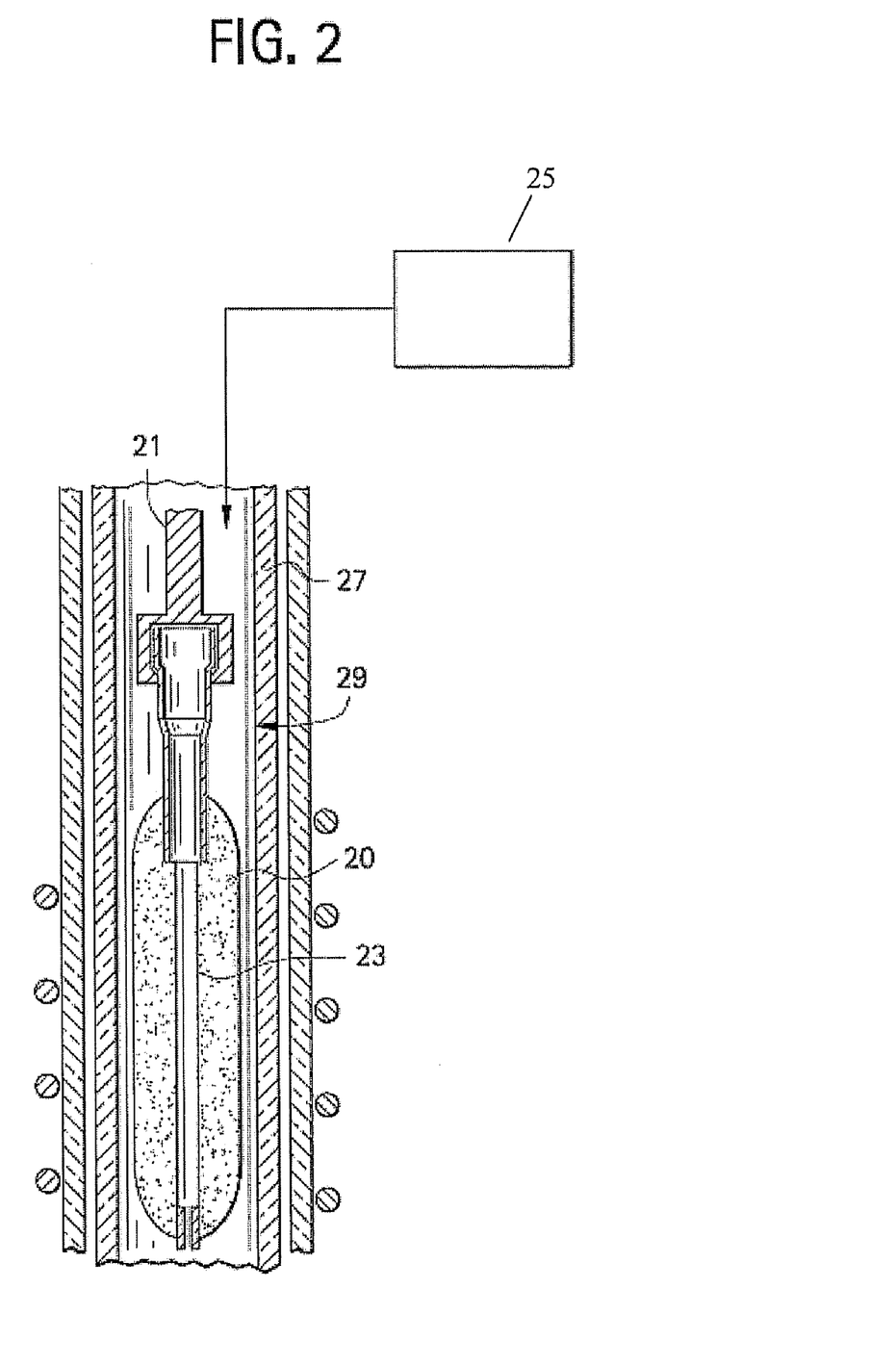
FIG. 2 illustrates a cross-sectional side view of a consolidation process in accordance with the invention.
Figure 3:
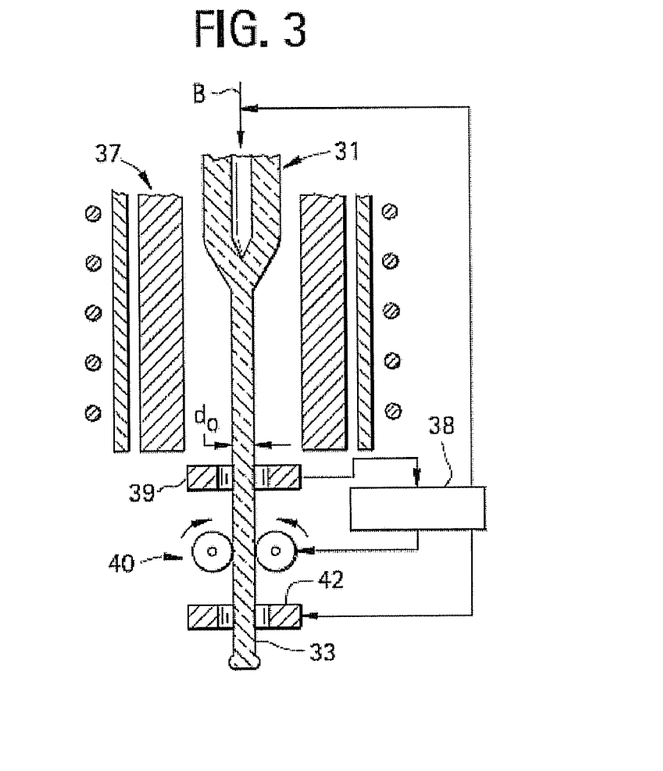
FIG. 3 illustrates a redraw process for forming a core cane.

As illustrated in FIG. 2, the soot preform 20 including the cylindrical soot region 23 may be consolidated in a consolidation furnace 29 to form a consolidated blank 31 (shown in FIG. 3). Prior to consolidation, the mandrel 24 illustrated in FIG. 1 is removed to form a hollow, cylindrical soot blank preform. During the consolidation process, the soot preform

20 is suspended, for example, inside a pure quartz muffle tube 27 of the furnace 29 by a holding mechanism 21. Preferably, before the consolidation step, the preform 20 is exposed to a drying atmosphere provided by a gas supply 25. For example, a suitable drying atmosphere may include about 95 percent to 99 percent helium and 1 percent to 5 percent chlorine gas at a temperature of between about 950° C. and 1250° C. and a suitable drying time ranges from about 0.5 and 4.0 hours. The soot preform can also be doped, if desired, for example using a dopant gas having fluorine or other optical fiber dopants therein. For example, to dope with fluorine, $SiF_4$ and/or $CF_4$ gas may be employed. Such dopant gases may be employed using conventional doping temperatures, for example between about 950 and 1250° C. for 0.25 to 4 hours.

During the void trapping consolidation step, which preferably takes place after a soot drying step, the furnace temperature is raised and the preform 20 is consolidated at a suitable temperature, for example between about 1390° C. and 1535° C. to form a consolidated preform. Alternatively, and more preferably, gradient sintering may be employed whereby the soot preform 20 is driven down through a hot zone of the furnace 29 which is maintained at a temperature of between about 1225° C. to 1550° C., more preferably between about 1390° C. and 1535° C. For example, the preform may be held in an isothermal zone which is maintained at a desired drying temperature (950-1250° C.), after which the soot preform is driven through a zone which is maintained at a desired consolidation temperature (e.g. 1225° C. to 1550° C., more preferably 1390° C. and 1535° C.) at a rate of speed which is sufficient to result in the preform 20 temperature increasing by greater than 1° C./min. Upper zones of the furnace can be maintained at lower temperatures which facilitate a drying and impurity removal step. The lower zone can be maintained at the higher temperatures desired for consolidation. In one preferred embodiment, the soot containing preform is downfed through a consolidation hot zone at a first downfeed rate, followed by downfeeding of the preform through a second hot zone at a second downfeed rate which is less than that of the first downfeed rate. Such a consolidation technique results in the outside portion of the soot preform sintering before the rest of the preform sinters, thereby facilitating trapping of gases which will in turn facilitate formation of and retaining of voids in the resultant consolidated glass. For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min, more preferably greater than 14° C./min. Preferably, the first consolidation rate results in the outside of the preform increasing in temperature at a rate which is greater than 2, more preferably greater than 3, and most preferably greater than about 4° C./min higher than the heating rate of the second consolidation rate. If desired, a third consolidation step can be employed which heats at a slower rate (e.g. less than 10° C./min). Alternatively, the soot preform can be sintered at even faster rates in order to create more voids by driving the soot preform through a furnace hot zone where the temperature is greater than 1550° C., more preferably greater than 1700° C., even more preferably greater than 1900° C. Alternatively, the soot preform can be sintered at even faster rates external to the furnace by using an open flame or plasma torch in contact with the soot. If desired, the optical fiber preform can be produced using a series of different consolidation steps, some of which may include conventional consolidation steps to completely sinter a particular preform region into a void-free fully consolidated glass, after which additional soot is deposited and sintered using a void trapping consolidation step. Preferred sintering gases which may be used in the void trapping consolidation step are those which comprise at least one gas selected from the group consisting of nitrogen, argon, $CO_2$, oxygen, Chlorine, $CF_4$, CO, $SO_2$, krypton, neon, and mixtures thereof. Each of these gases exhibits a relatively low permeability in silica glass at or below the consolidation temperature which is suitable for forming voids in accordance with the methods present invention. More preferably, the sintering gas used to form the non-periodically located voids in the annular void containing region is selected from the group consisting of (1) krypton gas or (2) chlorine gas plus at least one of nitrogen, carbon dioxide, or sulphur dioxide, argon or krypton, or (3) mixtures thereof. This chlorine gas can be provided either during the hole producing consolidation step, or alternatively the chlorine can be supplied to this glass region prior to the consolidation step, e.g. by using a sufficient amount of chlorine during the drying step that the chlorine is retained within the glass, preferably in an amount greater than 2000 ppm by weight in the glass of this region, more preferably greater than 3000 ppm by weight in the glass of this region.

Preferably these void producing gases are employed either alone or in combination in an amount between 5 and 100 percent by volume, more preferably between about 20-100 percent by volume and most preferably between about 40-100 percent by volume. The remainder of the sintering gas atmosphere is made up of a suitable diluent or carrier gas such as, for example, helium, hydrogen, deuterium, or mixtures thereof. Generally speaking, the greater the percentage by volume of void producing gases (nitrogen, Ar, $CO_2$, $O_2$, $Cl_2$, $CF_4$, CO, $SO_2$, krypton, neon, or mixtures thereof) that is employed in the sintering gas, the larger and more abundant the voids will be in the resultant consolidated glass. More preferably, the sintering gas for use in forming the voids during the consolidation step comprises at least one gas selected from the group consisting of nitrogen, argon, $CO_2$, oxygen, and krypton, neon, and mixtures thereof. These gases can be utilized entirely alone or in mixtures of such gases along with a carrier gas such as helium. One particularly preferred void producing gas is nitrogen. When employing nitrogen and/or argon either together or individually as a void producing sintering gas it is preferred that the nitrogen and/or argon be employed in the sintering atmosphere in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as helium. These gases have been successfully employed at concentrations greater than 85 percent by volume. In fact, up to 100 percent nitrogen gas, up to 100 percent argon gas, and up to 100 percent oxygen gas have been utilized successfully. Voids can also be created by sintering the soot in a low permeability gas (e.g. nitrogen, argon, $CO_2$, oxygen, Chlorine, $CF_4$, CO, $SO_2$) under a partial vacuum (e.g., wherein the preform is immersed in a sintering atmosphere at a pressure of between about 40 to 750 Torr), and in such cases use of a diluent relatively high permeability gas such as helium is not necessary. Using the void producing consolidation techniques disclosed herein, it is possible to make optical fibers having a cladding comprises a void containing region having a regional void area percent between about 2 and 6 percent, and an average number density of holes greater than 0.2, more preferably greater than 0.5, even more preferably greater than 1.0, and most preferably greater than 2 holes per micron$^2$. Regional void area percent, as used herein, means the total area of the voids in a void containing annular region divided by the total area of the void containing annular region (when the optical fiber is viewed in cross-section taken perpendicular to the axis of the optical fiber) times 100, the void containing region being defined by the inner and outer boundaries of the void containing region. For example, if the radially innermost edge of the radially innermost void in the fiber has a radial location of 10 microns from the axial centerline of the fiber, and the radially outermost edge of the radially outermost void in the fiber has a radial location of 15 microns from the centerline, then the area of the void containing region is approximately 225−100=125 square microns. If the total cross sectional area of voids contained in this void containing region is 5 square microns, then the void area percent of the void containing region is approximately 4 percent. Regional void area fraction, as used herein, means the total area of the voids in a void containing annular region divided by the total area of the void containing annular region (when the optical fiber is viewed in cross-section taken perpendicular to the axis of the optical fiber). Average number density of holes, as used herein, means the total number of holes in the void containing annular ring region divided by the area of the void containing annular ring region. By designing the optical fibers so that the cladding comprises a void containing region spaced from the core region, and wherein the void containing annular comprises a regional void area percent between about 2 and 10 percent, and an average number density of holes greater than 0.5, more preferably greater than 1.0, even more preferably greater than 2 holes per micron$^2$, and most preferably greater than 5 holes per micron$^2$, much greater uniformity of hole distribution can be achieved both across the fiber cross section and along the length of the optical fiber, thereby resulting in more consistent improved bend performance along the length of the optical fiber. For example, by designing the fibers to have average number density of holes and regional void area percent in the ranges describe above, an improved hole distribution uniformity can be achieved throughout the circumference and width of the annular hole containing region and along the length of the fiber sufficient to result in a maximum bend loss less than 2 dB per 10 mm diameter turn for an entire fiber length which is greater than 1 m, more preferably greater than 2 m, and even more preferably greater than 100 m, and most preferably greater than 10 km. More preferably, the hole containing region comprises a hole distribution uniformity throughout the circumference and width of the annular hole containing region and along the length of the fiber sufficient to result in a maximum bend loss less than 1 dB per 10 mm diameter turn for an entire fiber length which is greater than 1 m, more preferably greater than 2 m, and even more preferably greater than 100 m, and most preferably greater than 10 km. Even more preferably, the hole containing region comprises a hole distribution uniformity throughout the circumference and width of the annular hole containing region and along the length of the fiber sufficient to result in a maximum bend loss less than 0.5 dB per 10 mm diameter turn for an entire fiber length which is greater than 1 m, more preferably greater than 2 m, and even more preferably greater than 100 m, and most preferably greater than 10 km.

In combination with the other sintering gases described above, it is desirable to employ a consolidation process which includes a downfeed of the preform at a rate and temperature which is sufficient to result in at least some of the consolidation gases being intentionally trapped. This can occur, for example, by heating of at least a portion of the soot preform greater than about 10° C./min, more preferably greater than about 12° C./min, even more preferably greater than about 14° C./min. The sintering temperatures employed in the present invention preferably can range from 1100° C. to 1600° C., more preferably between about 1400 and 1550° C., and most preferably between about 1480 and 1550° C. One particularly preferred sintering temperature is approximately 1490° C. Additional information related to manufacturing such void containing regions within the cladding of the optical fiber can be found, for example, in U.S. Pat. No. 7,450,806, the specification of which is hereby incorporated by reference in its entirety.

FIG. 3 illustrates a process which may be used to draw a core cane for use in the present invention. For example in one such embodiment, a soot preform is formed as described above with respect to FIG. 1, after which the soot preform is consolidated using conventional consolidation techniques (e.g., using consolidation temperatures of higher than 1300° C. in an atmosphere of 100 percent helium) to form a void free core preform. For example, in the case of a fiber preform which is to be used to make a pure silica core fiber, the core preform would consist of relatively pure silica with no significant index of refraction adjusting dopants. Alternatively, in the case of an optical fiber preform which is to be used to make a pure germania doped core fiber, the core preform could consist of a germania doped core region and optionally a portion of the cladding (e.g. undoped silica cladding). The resultant consolidated core blank 31 is placed in a core cane draw furnace 37 and at least one rod-shaped core cane segment 33 having a reduced outer diameter is drawn therefrom. The preform blank 31 is heated to a temperature of, for example, between about 1700° C. and 2000° C. The controls 38 control the tension applied to the cane by suitable control signals to a tension mechanism 40, shown here as two tractor wheels, to draw down the cane 33 at the proper speed. In this way, it is possible to derive a length of core cane 33 having an outer diameter dimension of for example between about 1 mm and 16 mm. This core cane can then be used as the target or mandrel 24 for additional soot deposition or as the rod in a rod in tube process, as will be described further below.

Figure 4:
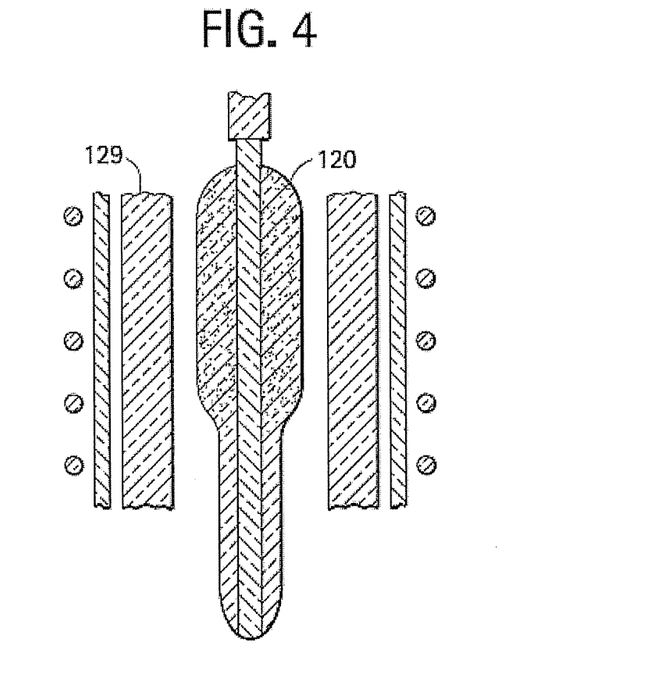
FIG. 4 illustrates consolidation of soot which has been deposited onto a core cane.
Figure 5:
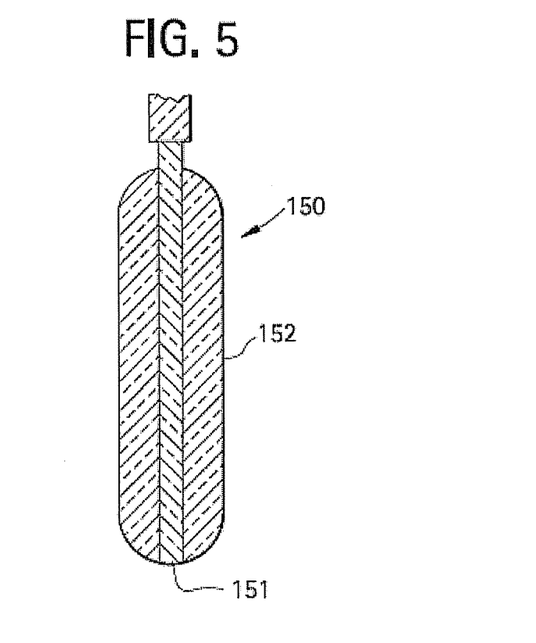
FIG. 5 illustrates the fully consolidated preform which results from the consolidation step illustrated in FIG. 4.

In one preferred embodiment, the process described above with respect to FIG. 3 can be used to form a core cane blank which can then be used as the target or mandrel for additional soot deposition which will be consolidated using the void forming techniques disclosed herein and thus eventually become the cladding of the optical fiber. In one such embodiment, for example, a fully consolidated, void free glass core cane can be used as the bait rod 24 in the soot deposition step illustrated in FIG. 1. The glass core cane may be undoped silica so the resultant optical fiber will be silica core fiber whose core consists essentially of pure silica. Alternatively, the core cane may consist of one or more doped regions which together form the light transmitting core region of the optical fiber. After the soot is deposited onto the glass core cane, the outer soot region 120 can be fully consolidated in consolidation furnace 129 as illustrated in FIG. 4. Preferably, during this consolidation step, the void forming consolidation process described above is carried out to form a consolidated optical fiber preform 150, as illustrated in FIG. 5.

As described above, preferred gases for use in the void forming consolidation step include at least one gas selected from the group consisting of nitrogen, argon, $CO_2$, oxygen, Chlorine, $CF_4$, CO, $SO_2$, krypton, neon, and mixtures thereof. Preferably these void producing gases are employed either alone or in combination in an amount between 5 and 100 percent by volume, more preferably between about 20-100 percent by volume and most preferably between about 40 and 100 percent by volume. The remainder of the sintering gas atmosphere is made up of a suitable diluent or carrier gas such as, for example, helium, hydrogen, deuterium, or mixtures thereof. Generally speaking, the greater the percentage of void producing gases (nitrogen, Ar, $CO_2$, Kr, $O_2$, $Cl_2$, $CF_4$, CO, $SO_2$, Ne) employed in the sintering gas, the larger and more abundant the voids will be in the resultant consolidated glass. One particularly preferred void producing gas is nitrogen, which is preferably employed in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as, for example, helium. Voids can also be created by sintering the soot in a low permeability diluent gas (e.g. nitrogen, argon, $CO_2$, oxygen, Chlorine, $CF_4$, CO, $SO_2$) under a partial vacuum (e.g., wherein the sintering atmosphere is at a pressure of between about 40 to 750 Torr), and in such cases use of a diluent relatively high permeability gas such as helium is not necessary. Chlorine can be incorporated into the glass by using $Cl_2$, $SiCl_4$ or other chlorine containing dopants. Using the void producing consolidation techniques disclosed herein, it is possible to make optical fibers whose cladding comprises a void containing region having a regional void area percent greater than 0.5 percent, more preferably greater than about 1, even more preferably greater than about 5 and most preferably greater than about 10 percent. Most preferably, the region having holes does not extend to the outer edge of the cladding such that there are open voids or holes on the outside of the fiber.

The sintering temperatures employed in the present invention preferably range from 1100° C. to 1550° C., more preferably between 1300° C. and 1500° C., and most preferably between 1350° C. and 1500° C. One preferred sintering temperature is approximately 1490° C. The gaseous atmosphere employed during the consolidation process, the temperature inside the consolidation furnace, and preform consolidation rate are selected so that, during the soot consolidation process, gases are intentionally trapped within the preform, forming holes in the consolidated glass. These gas containing voids are preferably not entirely outgassed prior to and/or during the fiber draw process, so that the voids remain in the fiber after the fiber has been drawn. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or faster draw speeds tend to increase the size as well as the area percent of the holes. Selection of a gas that is more permeable in glass at the consolidation temperature will result in smaller voids. Sintering rate can also have a significant effect on hole size and hole quantity. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 10° C./min, more preferably greater than about 12° C./min, even more preferably greater than about 14° C./min. Generally speaking, an optical fiber preform having a lower soot density will result in formation of more voids. However, the density of the deposited soot in a particular optical fiber preform can be varied to position more holes (higher regional void area percent) where desired. For example, a first high density soot region can be deposited directly onto a consolidated glass (e.g. pure silica) core cane, followed by a second region of soot having a lower density than that of the first. This causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void containing preforms which alternate between low or no void containing regions and higher void containing regions; wherein the initial soot density radial variation is greater than 3 percent over a distance of at least 100 microns. Such preforms can be used, for example, to make optical fibers having cladding regions which alternate between regions of void free glass and void containing glass. Fibers having such alternating void containing and void-free regions would exhibit properties useful as Bragg gratings. Optical preforms produced by the method described herein are preferably comprised of a void-free germania doped core, a void-free silica inner cladding, a void-containing silica ring and a void-free silica overclad. The void-containing ring region can contain over approximately 1,000,000 voids in the cross-sectional slice of the preform wherein the voids can be approximately 1 to 10 microns in average diameter and comprised approximately 1-20 area percent voids. These voids are typically discrete and isolated spheroid shape surrounded by silica, therefore each void is non-continuous in the axial or radial position along the length of the optical preform. Upon drawing the optical preform into an optical fiber the voids become elongated in the direction of draw.

During the drawing of the optical fiber preform to an optical fiber that the number of voids in any given cross-section decreases from the original number in the preform to that of the drawn fiber. For example, a 60 mm diameter preform having 100,000 voids in a cross-sectional ring in the preform can yield 200 voids in the cross-sectional ring for the 125 micron diameter drawn fiber. This mechanism for reduction in number is thought to be due to "diffusional coalescence", i.e., the voids are coalescing together to form fewer numbers of voids. It is thought that the degree of diffusional coalescence which occurs during any step of reducing the diameter of a void containing preform (e.g. drawing the preform into fiber, redrawing the preform into a smaller preform, etc.) can be influenced by the time-temperature history of the preform during the diameter reduction step, choice of gas in the voids and, composition of the glass surrounding the voids. Therefore, the same preform that results in 200 cross-sectional voids in the optical fiber can also yield, e.g., from 500 or 1,000 to even 10,000 voids in cross-section and can be controlled by the above preform processing parameters and glass compositions.

In contrast, optical fiber preforms made by a series of continuous tubes in stack-and-draw process or by drilling holes along the axial length of a preform, do not undergo this phenomenon, i.e., the number of voids in the preform is substantially similar to the number of voids in the drawn optical fiber. Thus unlike these methods, non-continuous void-containing preforms can have tailored microstructure in the fiber in order to obtain optical fiber attributes. One should also note that using the conventional stack-and-draw process or by drilling holes along the axial length of a preform it can rapidly become difficult and cumbersome to produce greater than, for example, 50 voids. In contrast, fiber produced from preforms disclosed herein can yield hundreds, even thousands of voids in the cross-section.

Referring to FIG. 5, using the techniques described above, an optical fiber preform 150 can be formed which comprises a void-free core region 151 which is surrounded by a cladding 152 which is comprised of a plurality of voids. By forming the void containing region in cladding 152 with a sufficient number of voids of an appropriate size, cladding 152 will serve as an optical cladding which guides light along core region 151 after the optical fiber preform is drawn into an optical fiber. Alternatively, the void containing region can be employed to improve the bend performance of the optical fiber. If desired, prior to drawing the preform 150 into an optical fiber, additional soot can be deposited over cladding region 152 and consolidated. The additional deposited cladding material may or may not be consolidated to contain voids, as desired.

Figure 6:
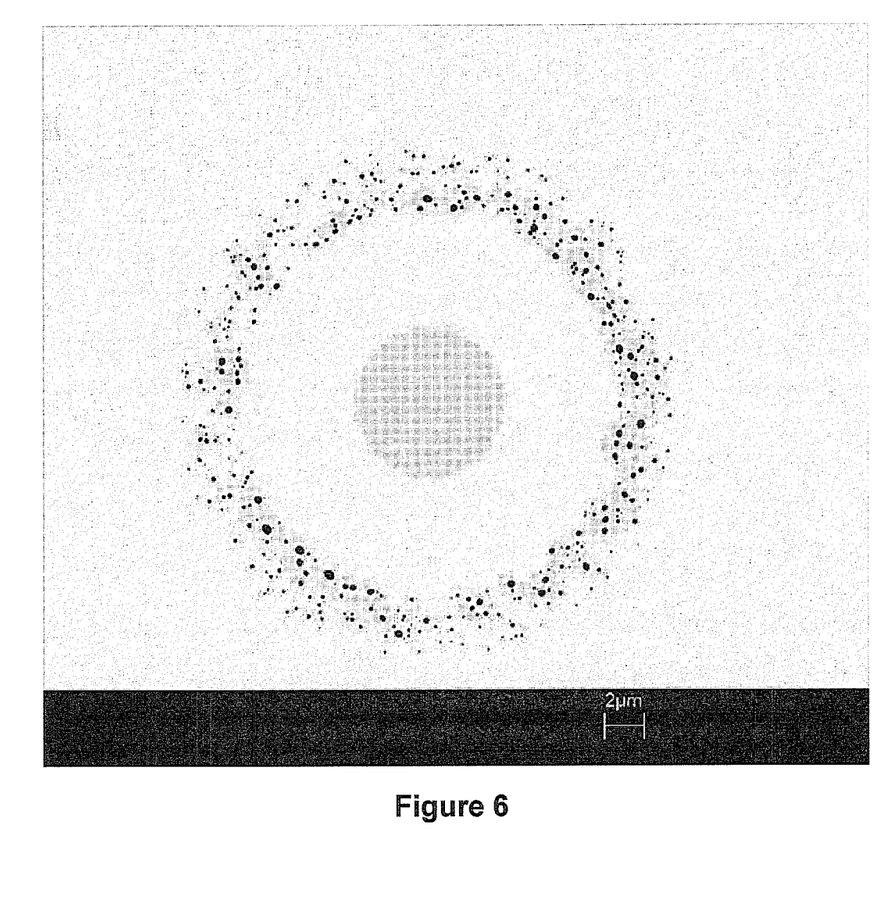
FIG. 6 illustrates a photograph of a cross-section of a fiber made in accordance with one embodiment of the invention.

An example of a fiber which is drawn from such a preform is illustrated in FIG. 6. The fiber in FIG. 6 comprises a core region which is surrounded by a cladding region which comprises voids which are positioned to be effective to guide light along the silica core.

Alternatively, instead of depositing soot onto an already formed core cane, the void forming process described above can be used to form a tube of consolidated glass having a void containing region therein as described above with respect to FIG. 2, and that tube can be used to sleeve a core cane.

Figure 7:
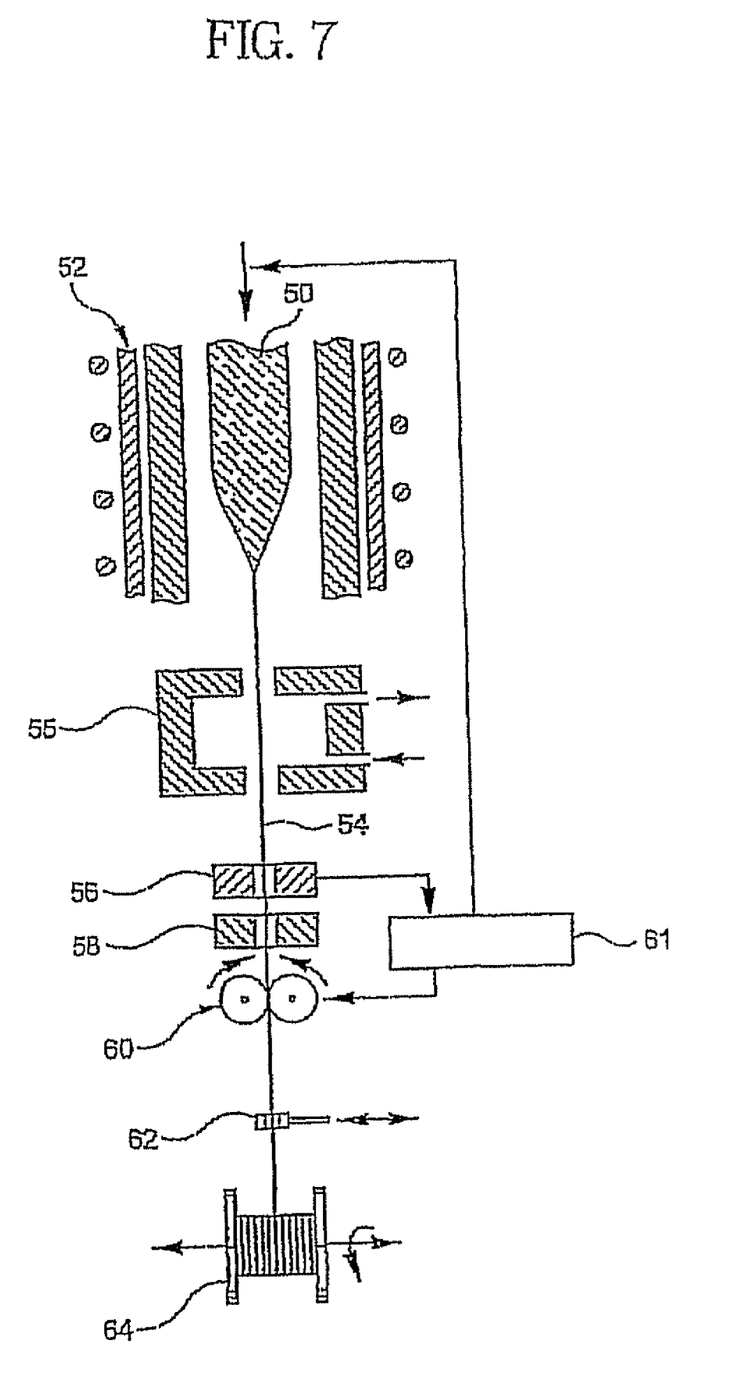
FIG. 7 illustrates a draw process and apparatus that may be employed in the method of the present invention.

In any of the embodiments disclosed herein, the resulting final consolidated optical fiber preform 50 may be drawn into an optical fiber by positioning the preform within a draw furnace 52 as shown in FIG. 7, and then heating and drawing the optical fiber 54 using conventional methods and apparatus. The fiber 54 is then cooled in cooling chamber 55 and measured for final diameter by non-contact sensor 56. One or more coatings may be applied and cured by coating apparatus 58. During draw, the fiber 54 passes through a tension assembly 60 whereby tension is applied to draw the fiber 54 from the preform 50. The tension is controlled via control apparatus 61 to maintain the fiber diameter at a predetermined set point. Finally, the coated fiber 54 is wound by feedhead 62 onto a fiber storage spool 64.

The same process described above with respect to FIG. 3 for forming core canes can alternatively be used to redraw void containing consolidated tubes. Such a redraw process can be used to modify the size of the voids contained in the tube. For example, the greater the diameter reduction that occurs when the void containing preform is redrawn, the smaller the void size will be in that preform.

Using the void producing consolidation techniques disclosed herein, optical fibers have been achieved which are comprised of a core region having a first refractive index and a cladding region having a second refractive index lower than that of the core such that light which is transmitted through the fiber is retained generally within the core, whereby said voids are located in and thereby form the cladding of said optical fiber and the void area percent of the voids is substantially non-zero.

Using the techniques described herein, fibers can be made wherein the maximum size of any of the voids, in the region where the fraction of power of light is greater than 80 percent, is less than the wavelength of light being transmitted. By maximum size, we mean the maximum diameter of any particular void when the optical fiber is viewed in perpendicular cross-section transverse to the longitudinal axis of the fiber. For example, fibers have been made wherein the mean void diameter in the void containing region is between 5 and 500 nm, more preferably between 30 and 300 nm, even more preferably between 30 and 200 nm, and most preferably between 30 and 150 nm.

Index adjusting dopants such as germanium and fluorine can be used, if desired, either individually or together, to further adjust the refractive index of the core with respect to the index of refraction of the cladding or with respect to the index of refraction of pure silica. For example, in one such preferred embodiment, a germanium core cane is used as a starter rod, upon which additional soot cladding material is deposited, preferably using OVD deposition techniques as described above. The soot cladding region is then consolidated as described above to form a void containing cladding region around the germania doped silica core region.

Such a fiber can be used in telecommunication networks (typically operating in 850, 1310 and/or 1550 nm windows) including long-haul, metro, access, premise and data centers as well as data communication applications and control area networks within buildings and mobile (auto, bus, train, plane) applications. Such telecommunications networks typically include a transmitter and receiver which is optically connected to the optical fiber.

In some embodiments, the fibers disclosed herein exhibit non-periodic void containing region which when viewed in cross-section exhibit greater than 100 voids, more preferably greater than 200 voids, even more preferably greater than 400 voids, and in some embodiments greater than 600 voids in the annular void containing region of a given optical fiber perpendicular cross-section.

For example, the fibers disclosed herein are capable of superior bend resistance compared to fibers of the prior art while simultaneously exhibiting excellent mode field diameters and reduced heat induced loss. By superior, we mean that using the methods disclosed herein, it is possible to make fibers which are single moded at 1550 nm in some embodiments, also at 1400 nm in other embodiments, and also at 1260 nm in still other embodiments, and which are capable of less than 0.5 dB attenuation increase at 1550 nm per turn for a 20 mm diameter bend while simultaneously exhibiting mode field diameters greater than 9 microns, and more preferably greater than 10 microns, at 1550 nm. Such excellent bend performance makes these fibers attractive candidates for fiber-to-the-home, access fiber, fiber-in-the-home applications, and fiber jumpers (these are typically short sections of fiber (1-20 meters) with connectors on each end to connect to an optical system or device). For example, the fibers disclosed herein may be employed in an optical fiber telecommunications system comprising a transmitter, a receiver, the fiber(s) being optically connected to said transmitter and receiver. Preferably in such applications (i.e. when the fiber is acting as a transmission fiber in a telecommunications system) the fiber is devoid of any active elements such as erbium, etc.

Heating the optical fibers disclosed herein, such as the heating that occurs as the result of fusion splicing the fiber to another optical fiber, can cause the voids in the fibers to collapse. Such collapse can result in loss of optical power into higher order modes and can also increase the mode field diameter in the heated regions of the fiber, contributing to splice loss and mode field diameter mismatch. However, by including a sufficient amount of at least one dopant selected from fluorine and chlorine into the hole-containing region of the fiber, such splice loss and mode field diameter mismatch can be minimized. For example, when exposed to heat sufficient to cause voids in the fibers to collapse, optical fibers disclosed herein are capable of providing a splice loss of less than 0.6 dB at all wavelengths between 1310 nm and 1625 nm and are further capable of providing for a mode field diameter change in the heated region of the fiber of less than 12% at all wavelengths between 1310 nm and 1625 nm.

Using the void producing consolidation techniques disclosed herein, it is possible to make optical fibers having cladding regions which exhibit a total void area percent (i.e., total cross-sectional area of the voids divided by total cross-sectional area of the optical fiber×100). Fibers have been made having total void area percents greater than about 0.01, greater than 0.05, greater than 0.1, greater than about 1, greater than about 5, and greater than 10 percent. However, in some embodiments, total void area percent of less than 1, and even less than 0.7, and in some embodiments less than about 0.2 percent, can result in greatly improved bend performance. In some preferred embodiments, the total void area percent is between 0.01 and 0.4 percent, more preferably between 0.02 and 0.2 percent. Such void containing cladding regions can be used to lower the refractive index relative to the core and thus form the cladding region which guides light along the core of the optical fiber. By selecting the appropriate soot consolidation conditions, a variety of useful optical fiber designs can be achieved. For example, by selecting the maximum void size in the cladding to be less than that of the wavelength of light which is to be transmitted (for example, less than 1550 nm for some telecommunications systems), and preferably less than one half of the wavelength of light which is to be transmitted along the fiber, low attenuation fibers can be achieved without having to use expensive dopants. Consequently, for a variety of applications, it is desirable that the holes in the annular void containing region exhibit a mean hole size which is between about 5 and 500 nm, more preferably between about 30 and 300 nm, even more preferably between about 30 and 200 nm, and most preferably between about 30 and 150 nm. In some embodiments, the fibers disclosed herein have greater than 100, more preferably greater than 200, even more preferably greater than 400, and in some embodiments greater than 600 holes when viewed in cross-section. Of course, the most preferred fibers will exhibit combinations of these characteristics. Thus, for example, one particularly preferred embodiment of optical fiber would exhibit greater than 500, the holes having a mean diameter between 30 and 200 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

Figure 8:
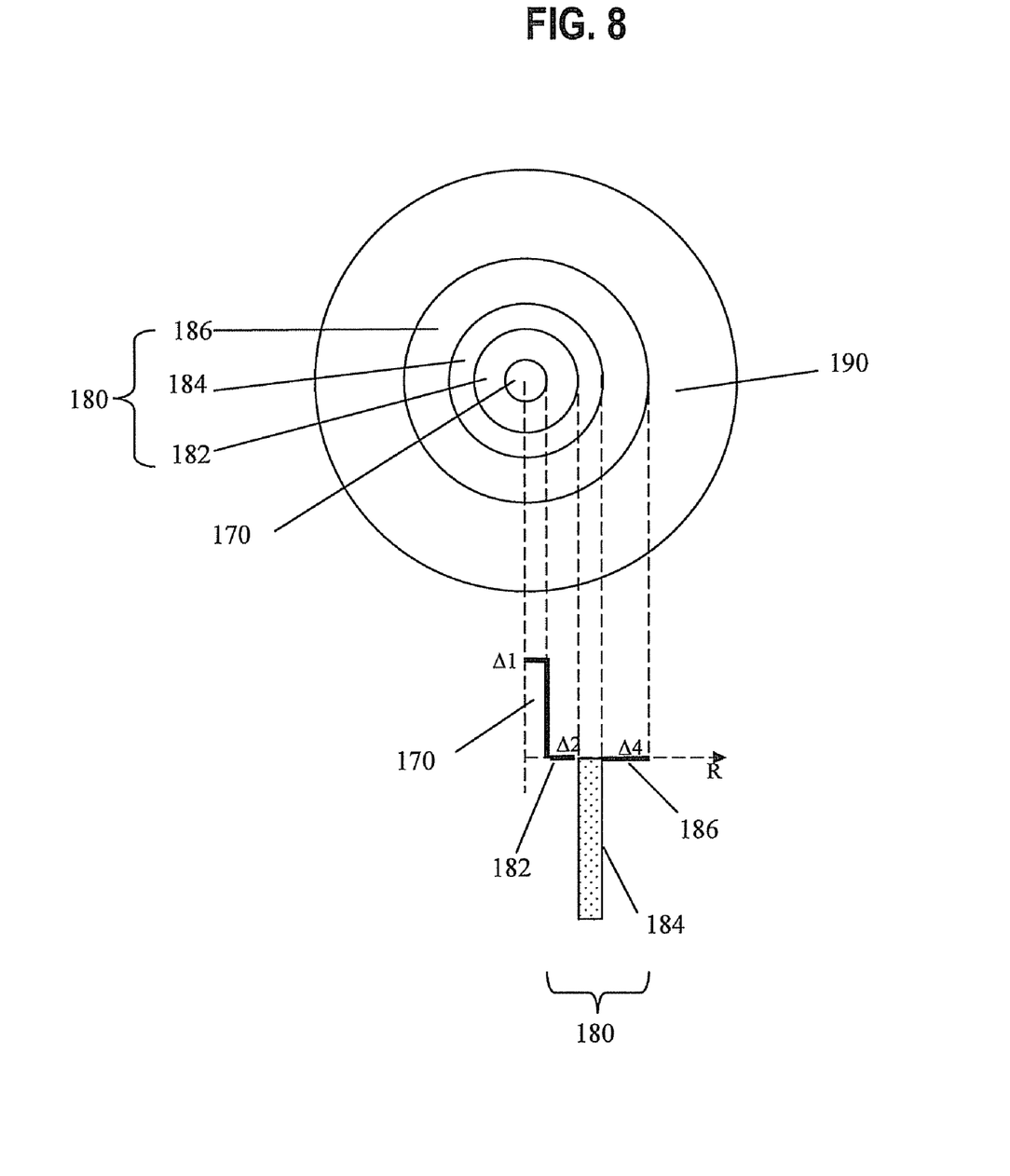
FIG. 8 schematically illustrates a cross-section of an optical fiber made in accordance with the invention, shown with a coating.

In one set of embodiments, the core region includes doped silica to provide a positive refractive index relative to pure silica, e.g. germania doped silica. The core region is preferably hole-free. As illustrated in FIG. 8, in some embodiments, the core region 170 comprises a single core segment having a positive maximum refractive index relative to pure silica $\Delta_1$ in %, and the single core segment extends from the centerline to a radius $R_1$, wherein $R_1$ is defined as the radius where the relative refractive index first reaches 0.05% going radially outward from the centerline. In preferred embodiments, $0.30\% < \Delta_1 < 0.40\%$ and $3.5 \mu m < R_1 < 5.0 \mu m$, such as $0.35\% < \Delta_1 < 0.40\%$ and $4.0 \mu m < R_1 < 4.5 \mu m$. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein $R_2$ is defined as the radius where the relative refractive index first reaches −0.05% going radially outward from $R_1$ and wherein the inner annular hole-free region has a radial width $W_{12}$, equal to $R_2-R_1$, and $W_{12}$ is greater than 1 μm. Radius $R_2$ is preferably greater than 8 μm, such as between 8 and 15 μm, and further such as between 9 and 12 μm. The ratio of the core radius $R_1$ to $R_2$, $R_1/R_2$, is preferably greater than 0.2, such as from 0.2 to 0.6, including from 0.3 to 0.5, and further including from 0.33 to 0.45. The intermediate annular hole-containing region 184 extends radially outward from $R_2$ to radius $R_3$ and has a radial width $W_{23}$, equal to $R_3-R_2$, wherein $R_3$ is defined as the radius where the relative refractive index first reaches −0.05% going radially inward from $R_4$. The outer annular region 186 extends radially outward from $R_3$ to radius $R_4$. Radius $R_4$ is the outermost radius of the silica portion of the optical fiber. One or more coatings may be applied to the external surface of the silica portion of the optical fiber, starting at $R_4$, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has a radial width $W_{23}$ which is not less than 0.5 μm. In some embodiments, $W_{23}$ is not less than 0.5 μm and not greater than 20 μm. In other embodiments, $W_{23}$ is not less than 2 μm and not greater than 12 μm. In other embodiments, $W_{23}$ is not less than 2 μm and not greater than 8 μm.

The cladding region 180 extends to a radius $R_4$ which is preferably not less than 40 μm; in some embodiments, $R_4$ is about 40 μm; in other embodiments, $R_4$ is not less than 60 μm; in other embodiments, $R_4$ is about 62.5 μm. In some embodiments, the outer annular region 186 has a radial width not less than 20 μm. In other embodiments, the outer annular region 186 has a radial width not less than 30 μm. In still other embodiments, the outer annular region 186 has a radial width not less than 40 μm. In some embodiments, the core region 170 comprises germania doped silica. In other embodiments, the core region 170 comprises fluorine doped silica.

The core region 170 can comprise a plurality of core segments, thus the core region comprises at least one core segment in any of the embodiments disclosed herein.

In some embodiments, the refractive index profile of the core region 170 provides single-moded transmission of the optical signals at 1550 nm, and further preferably provides a zero dispersion wavelength between 1300 and 1324 nm, and further preferably provides a mode field diameter at 1310 nm greater than 8.6 μm.

Preferably, the optical fiber disclosed herein further comprises a coating surrounding and directly adjacent the cladding region. In some embodiments, the optical fiber comprises a single coating layer surrounding and directly adjacent the cladding region.

In some embodiments, at least some of the holes contain at least one gas selected from the group consisting of argon, nitrogen, carbon monoxide, carbon dioxide, chlorine, oxygen, $CF_4$, $C_2F_6$, $SO_2$, Kr, Ne, and mixtures thereof. More preferably, the voids in the void containing region comprise krypton gas or chlorine gas plus at least one of nitrogen, carbon dioxide, argon, krypton or sulphur dioxide, or mixtures thereof.

The hole-containing region is doped with at least one dopant selected from fluorine and chlorine. In a preferred embodiment, the hole-containing region is doped with fluorine. In an alternative preferred embodiment, the hole-containing region is doped with chlorine. In a further alternative preferred embodiment, the hole-containing region is co-doped with both fluorine and chlorine. The region doped with fluorine and/or chlorine preferably substantially overlaps the hole-containing region and is preferably of relatively constant concentration over that region. The average concentration of fluorine in the hole-containing region preferably ranges from 0.4 wt % to 1.2 wt %, such as from 0.5 wt % to 1.0 wt %, and further such as from 0.6 wt % to 0.8 wt %. The average concentration of chlorine in the hole-containing region preferably ranges from 0.02 wt % to 0.4 wt %, such as from 0.05 wt % to 0.2 wt %, and further such as from 0.1 wt % to 0.15 wt %.

By doping the hole-containing region with fluorine and/or chlorine as disclosed herein, optical fiber can be produced that has reduced heat induced loss, such as reduced splice loss, as well as reduced percentage change in mode field diameter in the heated region of the fiber as compared to otherwise similarly manufactured fiber having a hole-containing region in the cladding that is not doped with fluorine or chlorine in the hole-containing region.

For example, optical fiber can be produced wherein when the fiber is exposed to heat sufficient to cause the holes in the hole-containing region in the fiber to collapse upon being spliced to another fiber, the fiber is capable of providing a splice loss of less than 0.6 dB at all wavelengths between 1310 nm and 1625 nm, such as a splice loss of less than 0.5 dB at all wavelengths between 1310 and 1625 nm, and further such as a splice loss of less than 0.4 dB at all wavelengths between 1310 and 1625 nm, and even further such as a splice loss of less than 0.3 dB at all wavelengths between 1310 and 1625 nm. In addition, optical fiber can be produced wherein when the fiber is exposed to heat sufficient to cause the holes in the hole-containing region in the fiber to collapse upon being spliced to another fiber, the fiber is capable of providing a splice loss of less than 0.2 dB for at least one wavelength between 1310 nm and 1625 nm, such as a splice loss of less than 0.1 dB for at least one wavelength between 1310 nm and 1625 nm. In addition, optical fiber can be produced wherein when the fiber is exposed to heat sufficient to cause the holes in the hole-containing region in the fiber to collapse in a heated region, the fiber is capable of providing for a mode field diameter change in the heated region of less than 12% at all wavelengths between 1310 nm and 1625 nm, such as a mode field diameter change in the heated region of less than 10% at all wavelengths between 1310 and 1625 nm, and further such as a mode field diameter change in the heated region of less than 8% at all wavelengths between 1310 and 1625 nm. Such fiber is capable of simultaneously providing superior bend resistance, such as less than 0.5 dB attenuation increase at 1550 nm per turn for a 20 mm diameter bend.

Figure 9:
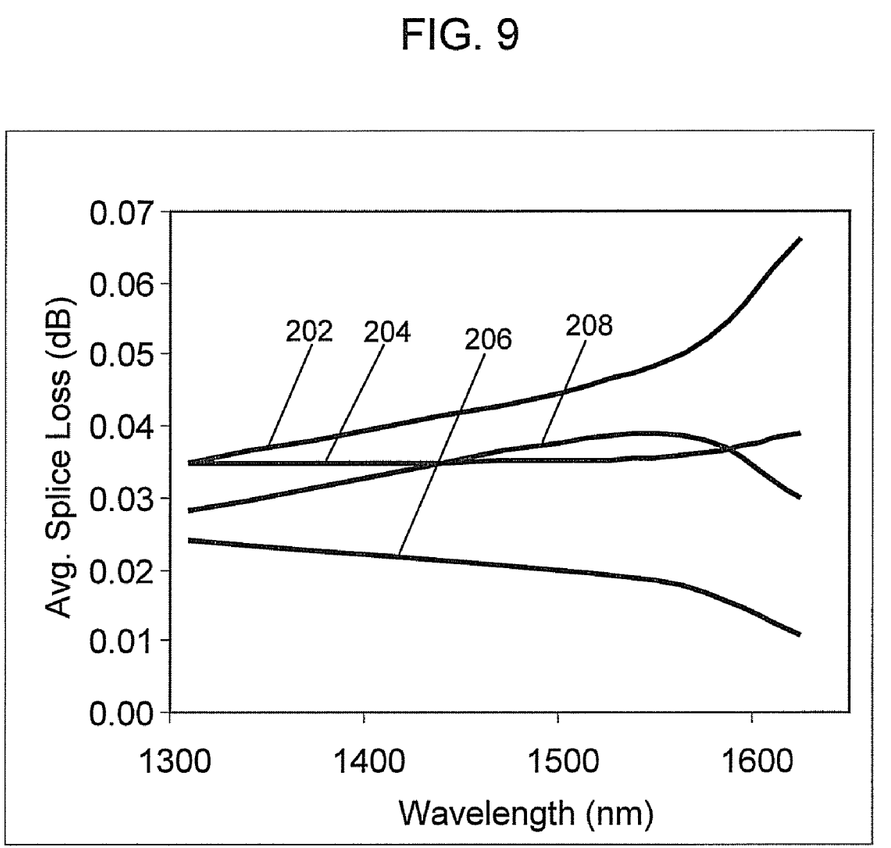
FIG. 9 shows splice loss as a function of wavelength for four different types of fibers.

FIG. 9 shows splice loss as a function of wavelength for four different types of fibers having a hole-containing region as described herein wherein the hole-containing region comprises krypton gas. Each of the four types of fibers was spliced to another similar type fiber using a standard fusion splicing process, thereby minimizing losses from other known mechanisms such as mode field diameter mismatch. Each of the four types of fibers also had a $\Delta_1$ of about 0.35% to 0.40%, an $R_1$ of about 4.0 to 4.5, an $R_2$ of about 10.5 to 11.5, and an $R_1/R_2$ of about 0.35 to 0.40. The first type of fiber 202 was not doped with either fluorine or chlorine in the hole-containing region. The second type of fiber 204 was doped with chlorine in the hole-containing region (about 0.2 wt %). The third 206 and fourth 208 types of fiber were doped with differing levels of fluorine (about 0.89 wt % and about 0.57 wt % respectively) in the hole-containing region. As can be seen from FIG. 9, the fibers doped with chlorine or fluorine exhibited lower splice loss than fiber that did not contain any chlorine or fluorine dopant in the hole-containing region. In addition, the difference in splice loss between fiber doped with chlorine or fluorine in the hole-containing region as compared to fiber not doped with either chlorine or fluorine in the hole-containing region generally increased with increasing wavelength.

Figure 10:
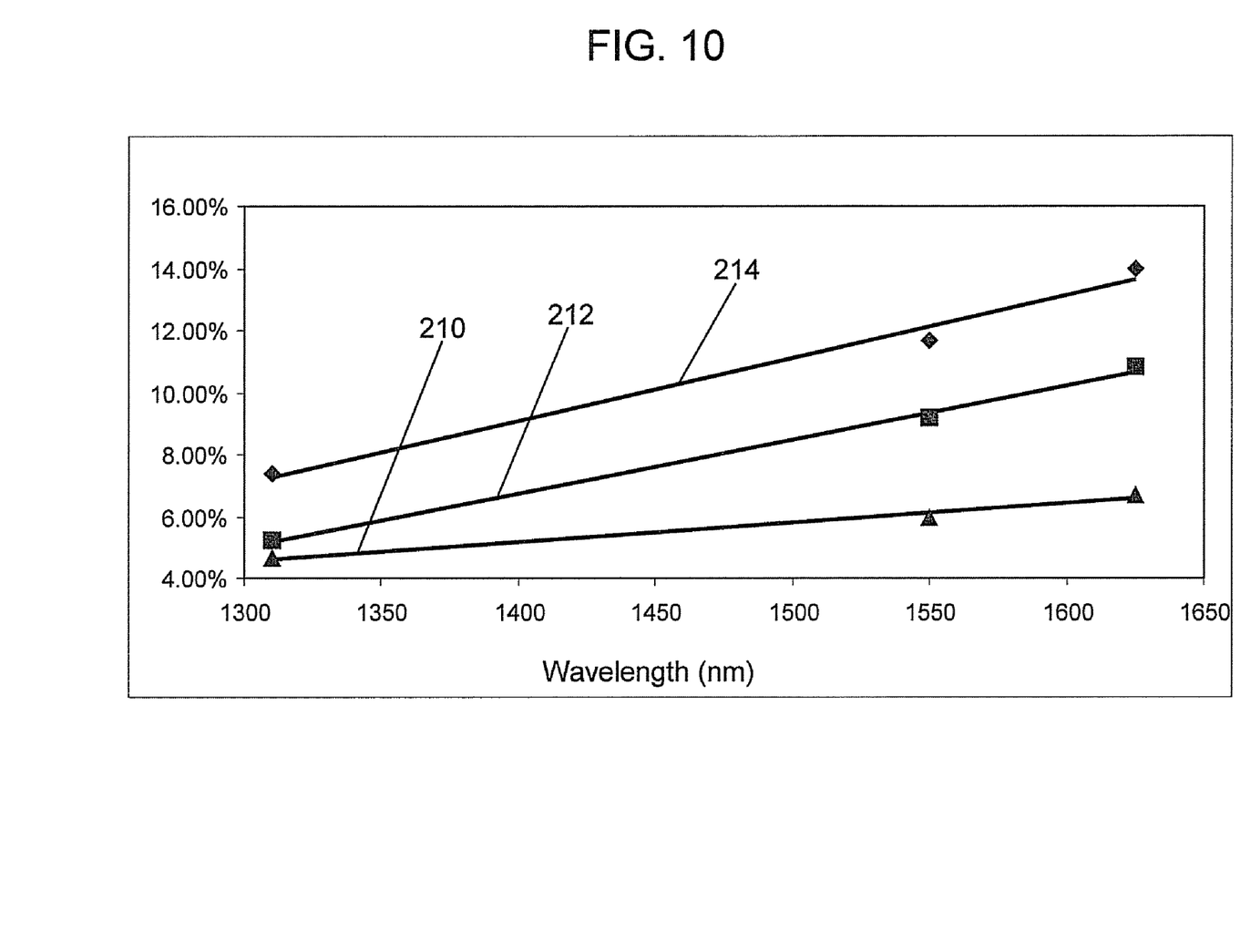
FIG. 10 shows percent mode field diameter change in the heated region of three different types of fibers.

FIG. 10 shows percent mode field diameter (MFD) change in the heated region of three of the four types of fibers described in reference to FIG. 9, fibers doped with differing levels of fluorine 210 and 212 (about 0.89 wt % and about 0.57 wt % respectively) and fiber not doped with either chlorine or fluorine 214. As can be seen from FIG. 10, the fibers doped with fluorine exhibited lower percent mode field diameter change in the heated region than fiber that did not contain chlorine or fluorine dopant in the hole-containing region. In addition, the difference in percent mode field diameter change between fiber doped with fluorine in the hole-containing region as compared to fiber not doped with either chlorine or fluorine in the hole-containing region generally increased with increasing wavelength.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A single mode microstructured optical fiber comprising:
a core region disposed about a longitudinal centerline and having a refractive index profile with a first refractive index, and
a cladding region surrounding the core region, the cladding region comprising an annular hole-containing region comprised of non-periodically dispersed holes;
wherein said non-periodically dispersed holes comprise a percent regional void area percent in said hole-containing region which is between 2 and 10 percent, and an average number density of holes in said hole-containing region is greater than 0.5 per microns$^2$, and wherein said annular hole-containing region is doped with at least one dopant selected from fluorine having an average concentration of from 0.4 wt % to 1.2 wt % and chlorine having an average concentration of from 0.05 wt % to 0.2 wt %.

2. The optical fiber of claim 1 wherein the annular hole-containing region is doped with fluorine.

3. The optical fiber of claim 1 wherein the annular hole-containing region is doped with chlorine.

4. The optical fiber of claim 1 wherein the annular hole-containing region is co-doped with both fluorine and chlorine.

5. The optical fiber of claim 1 wherein when the fiber is exposed to heat sufficient to cause the holes in the hole-containing region in the fiber to collapse upon being spliced to another fiber, the fiber is capable of providing a splice loss of less than 0.6 dB at all wavelengths between 1310 nm and 1625 nm.

6. The optical fiber of claim 1 wherein when the fiber is exposed to heat sufficient to cause the holes in the hole-containing region in the fiber to collapse in a heated region, the fiber is capable of providing for a mode field diameter change in the heated region of less than 12% at all wavelengths between 1310 nm and 1625 nm.

7. The optical fiber of claim 1 wherein the fiber is capable of providing a bend loss of less than 0.5 dB per turn at a wavelength of 1550 nm for a 20 mm diameter bend.

8. The optical fiber of claim 1 wherein the fiber has a mode field diameter of greater than 9 microns at a wavelength of 1550 nm.

9. The optical fiber of claim 1 wherein the core region comprises a core segment that extends from a centerline to a radius $R_1$ having a positive maximum refractive index relative to pure silica $\Delta_1$ in %, and the optical fiber further comprises an inner annular hole-free region between the core segment and the hole-containing region extending from a radius $R_1$ to a radius $R_2$, and having a radial width $W_{12}$, equal to $R_2-R_1$, wherein 0.30%<$\Delta_1$<0.40%, 3.5 µm<$R_1$<5.0 µm, $W_{12}$ is greater than 1 µm, and $R_1/R_2$, is greater than 0.2.

10. The optical fiber of claim 1 wherein the holes in the hole-containing region comprise krypton gas or chlorine gas plus at least one of nitrogen, carbon dioxide, argon, krypton or sulphur dioxide, or mixtures thereof.

11. A single mode microstructured optical fiber comprising:
   a core region disposed about a longitudinal centerline and having a refractive index profile with a first refractive index, and
   a cladding region surrounding the core region, the cladding region comprising an annular hole-containing region comprised of non-periodically dispersed holes;
   wherein said non-periodically dispersed holes comprise a percent regional void area percent in said hole-containing region which is between 2 and 10 percent, and an average number density of holes in said hole-containing region is greater than 0.5 per microns², and wherein when the fiber is exposed to heat sufficient to cause the holes in the hole-containing region in the fiber to collapse upon being spliced to another fiber, the fiber is capable of providing a splice loss of less than 0.6 dB at all wavelengths between 1310 nm and 1625 nm.

12. The optical fiber of claim 11 wherein the fiber is capable of providing a bend loss of less than 0.5 dB per turn at a wavelength of 1550 nm for a 20 mm diameter bend.

13. The optical fiber of claim 11 wherein when the fiber is exposed to heat sufficient to cause the holes in the hole-containing region in the fiber to collapse in a heated region, the fiber is capable of providing for a mode field diameter change in the heated region of less than 12% at all wavelengths between 1310 nm and 1625 nm.

14. The optical fiber of claim 11 wherein the annular hole-containing region is doped with at least one dopant selected from fluorine having an average concentration of from 0.4 wt % to 1.2 wt % and chlorine having an average concentration of from 0.05 wt % to 0.2 wt %.

15. The optical fiber of claim 11 wherein the annular hole-containing region is doped with fluorine.

16. The optical fiber of claim 11 wherein the annular hole-containing region is doped with chlorine.

17. The optical fiber of claim 11 wherein the annular hole-containing region is co-doped with both fluorine and chlorine.

18. The optical fiber of claim 11 wherein the fiber has a mode field diameter of greater than 9 microns at a wavelength of 1550 nm.

19. The optical fiber of claim 11 wherein the core region comprises a core segment that extends from a centerline to a radius $R_1$ having a positive maximum refractive index relative to pure silica $\Delta_1$ in %, and the optical fiber further comprises an inner annular hole-free region between the core segment and the hole-containing region extending from a radius $R_1$ to a radius $R_2$, and having a radial width $W_{12}$, equal to $R_2-R_1$, wherein 0.30%<$\Delta_1$<0.40%, 3.5 µm<$R_1$<5.0 µm, $W_{12}$ is greater than 1 µm, and $R_1/R_2$, is greater than 0.2.

20. The optical fiber of claim 11 wherein the holes in the hole-containing region comprise krypton gas or chlorine gas plus at least one of nitrogen, carbon dioxide, argon, krypton or sulphur dioxide, or mixtures thereof.

* * * * *